(12) United States Patent
Liu

(10) Patent No.: US 11,692,614 B2
(45) Date of Patent: *Jul. 4, 2023

(54) HOLLOW REDUCER FOR HIGH PRECISION CONTROL

(71) Applicant: SUZHOU HUAZHEN INDUSTRY RV REDUCER CO., LTD., Jiangsu (CN)

(72) Inventor: Weiwei Liu, Jiangsu (CN)

(73) Assignee: SUZHOU HUAZHEN INDUSTRY RV REDUCER CO., LTD., Suzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,245

(22) Filed: Nov. 17, 2021

(65) Prior Publication Data

US 2022/0074467 A1 Mar. 10, 2022

Related U.S. Application Data

(63) Continuation of application No. PCT/CN2020/078193, filed on Mar. 6, 2020.

(30) Foreign Application Priority Data

May 22, 2019 (CN) .......................... 201910474519.6
Dec. 31, 2019 (CN) .......................... 201911401058.6

(51) Int. Cl.
*F16H 1/32* (2006.01)
*F16H 55/08* (2006.01)
*F16H 57/08* (2006.01)

(52) U.S. Cl.
CPC ........... *F16H 1/32* (2013.01); *F16H 55/0873* (2013.01); *F16H 57/08* (2013.01);
(Continued)

(58) Field of Classification Search
CPC ........ F16H 1/32; F16H 55/0873; F16H 57/08; F16H 2001/323; F16H 2001/327; F16H 2057/085; F16H 55/08
See application file for complete search history.

(56) References Cited

U.S. PATENT DOCUMENTS 4,549,450 A * 10/1985 Pierrat ...................... F16H 1/32
475/168
6,699,152 B2 * 3/2004 Tanaka ...................... F16H 1/32
901/23
(Continued)

FOREIGN PATENT DOCUMENTS

CN 101666366 A * 3/2010 ............... F16H 1/32
CN 102966721 A * 3/2013
(Continued)

OTHER PUBLICATIONS

Xiaolu Zhu, Handbook of Gear Design, Jan. 2005, p. 804, Chemical Industry Press, Beijing, China.
(Continued)

*Primary Examiner* — Sherry L Estremsky

(57) ABSTRACT

A hollow reducer for high precision control includes a pin wheel housing and two-stage reduction components disposed in the pin wheel housing. A first-stage reduction component includes a driving wheel on a servo motor, a dual gear, and a planet wheel; and a second-stage reduction component includes 2-3 eccentric shafts distributed uniformly, cycloidal gears, a pin, rigid disks, and bearings, wherein two eccentric sections of the eccentric shaft support the cycloidal gears by means of the bearings, shaft extensions on two sides of the eccentric section of the eccentric shaft are supported on the left and right rigid disks by the bearings, and the rigid disks are supported on two sides of the pin wheel housing by the bearings.

3 Claims, 1 Drawing Sheet

(52) U.S. Cl.
CPC .. *F16H 2001/323* (2013.01); *F16H 2001/327* (2013.01); *F16H 2057/085* (2013.01)

(56) References Cited

U.S. PATENT DOCUMENTS

| | | | | |
|---|---|---|---|---|
| 7,534,184 | B2* | 5/2009 | Tsurumi | F16H 1/32 475/162 |
| 2008/0295623 | A1* | 12/2008 | Kurita | F16H 1/32 74/25 |
| 2022/0074466 | A1* | 3/2022 | Liu | F16H 55/08 |

FOREIGN PATENT DOCUMENTS

| | | | | | |
|---|---|---|---|---|---|
| CN | 107725687 | A | * | 2/2018 | ............... F16H 1/32 |
| CN | 108036027 | A | * | 5/2018 | |
| CN | 108843747 | A | * | 11/2018 | |
| CN | 108869644 | A | | 11/2018 | |
| CN | 108980285 | A | | 12/2018 | |
| WO | WO-2010119631 | A1 | * | 10/2010 | ............... F16H 1/32 |
| WO | WO-2014006833 | A1 | * | 1/2014 | ............... F16H 1/32 |
| WO | WO-2014030292 | A1 | * | 2/2014 | ............... F16H 1/32 |

OTHER PUBLICATIONS

Weidong He et al., Study on time-varying meshing stiffness of RV transmission cycloid gear based on Ansys, Journal of Dalian Jiaotong University, Apr. 2017, pp. 55-56, vol. 38, No. 2.

Meng Li, Research and Design of Small and Medium Power Case-Fixed RV-E Type Reducer, A thesis submitted for Master Degree at Harbin Institute of Technology, Jul. 2012, p. 41.

Ying Xi et al., Analysis of teeth clearances in robotic high precision RV reducer based on Adams, Chinese Journal of Construction Machinery, Dec. 2015, pp. 515-516, vol. 13, No. 6.

Wentao Wang, Thermal-structural coupling analysis of RV reducer, A thesis submitted for Master Degree in Mechanical Engineering at North University of Technology, Apr. 26, 2016, pp. 3, 17 and 35.

Zejiu Liu, Rolling bearing application manual, Jan. 2006, p. 891.

Su-Ran Cai et al., Sealing Technology of sealed deep groove ball bearing, Bearing, 2009, No. 5.

Eisman et al., Design and Application Manual for Rolling Bearings, May 1985, p. 221, Huazhong Institute of Technology, Wuchang, Hubei, China.

International Search Report of PCT Patent Application No. PCT/CN2020/078193 dated May 12, 2020.

* cited by examiner

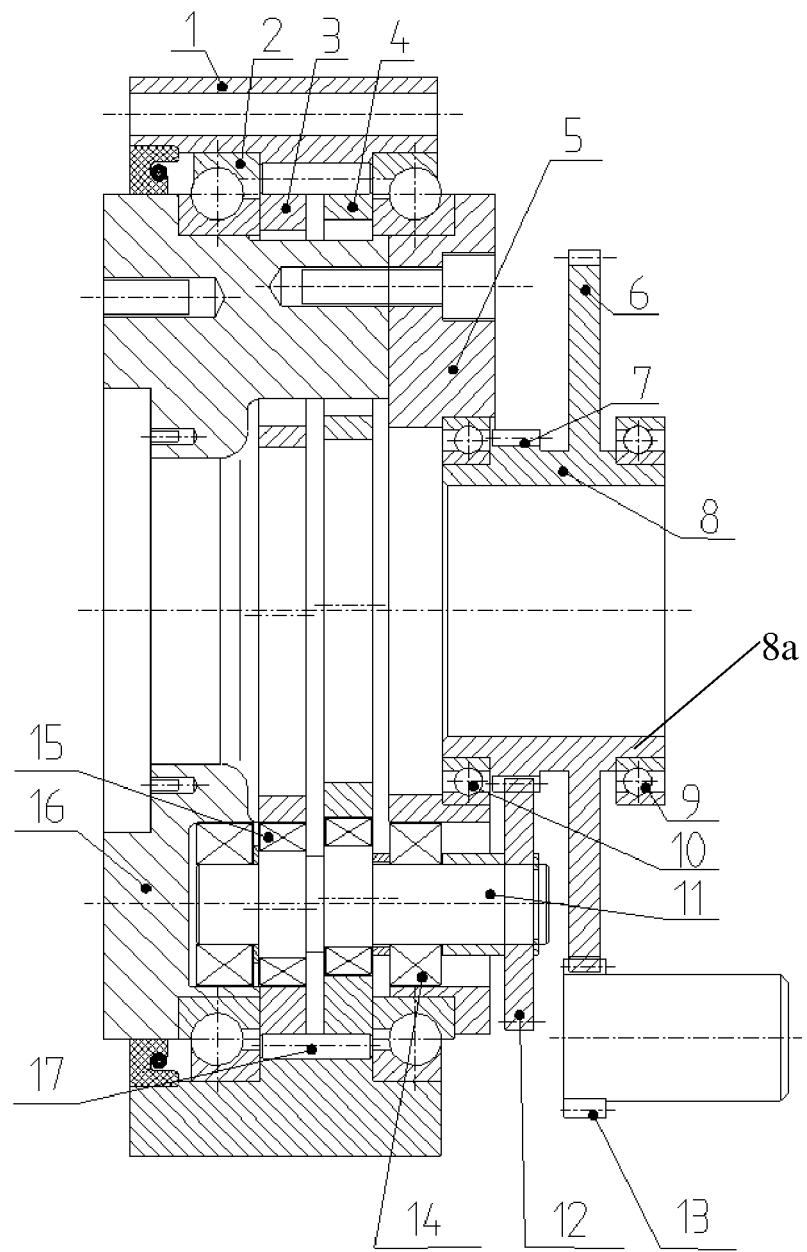

HOLLOW REDUCER FOR HIGH PRECISION CONTROL

CROSS REFERENCE TO RELATED APPLICATIONS

The present application is a Continuation Application of PCT Application No. PCT/CN2020/078193 filed on Mar. 6, 2020, which claims the benefit of Chinese Patent Application No. 201910474519.6 filed on May 22, 2019 and No. 201911401058.6 filed on Dec. 31, 2019. All the above are hereby incorporated by reference in their entirety.

BACKGROUND

The present application relates to the technical field of reducers for high precision control, in particular to a hollow reducer for high precision control with good dynamic characteristics, which can replace an RV-C reducer.

SUMMARY

Robots are deemed as the lustrous pearl on the top of the crown of the manufacturing industry and also serve as an important symbol representing the levels of scientific and technological innovation and high-end manufacturing industry of a country. However, joints of most domestic robots are equipped with Japanese RV reducers.

Domestic RV reducers have defects of a high temperature rise during operation, a short wear life, and poor dynamic characteristics. The poor dynamic characteristics are due to the following:

(I) Domestic researchers lack research on the theoretical foundation for reasonable meshing backlashes in modification of cycloidal gears.

As pointed out in page 804 of *Handbook of Gear Design*: "As proved in both theory and practice, the following ideal tooth profiles can be obtained by positive equidistant-positive radial moving composite modification: (1) reasonable meshing backlashes and radial gaps can be formed, which not only can compensate actual manufacture and installation errors, but can also ensure a sufficient number of simultaneously meshing teeth; (2) working portions of the tooth profiles are nearly the same as conjugated tooth profiles, thereby ensuring stable transmission; (3) the grinding process is simple." As verified by literature retrieval, there is no domestic argument on reasonable meshing backlashes in modification of cycloidal gears.

(II) As illustrated in physics, a reasonable meshing backlash is closely correlated with a thermal expansion amount of a cycloidal gear.

Domestic researchers make less study on thermal-structural coupling of RV reducers, and thermal dissipation conditions of the grease lubrication used in the reducers are not good. During operation, various situations are closely correlated with thermal conditions. Hence, it is necessary to consider effects of the temperature on the component volume, so as to avoid an expansion jam due to the excessively high temperature.

As illustrated in physics, a solid has the same expansion rule in different directions, and the volume expansion of a solid thus can be represented by the linear expansion rule in one direction. Therefore, the following conclusion is obtained:

A radial gap and two symmetric backlashes $\Delta c$ formed between a pin and a tooth socket of the cycloidal gear are closely correlated with the thermal expansion amount $\lambda$, of the cycloidal gear in the case when the reducer works at a rated torque.

(III) The positive equidistant-positive radial moving composite modification adopted by domestic researchers has a potential serious defect, that is, the backlash is far smaller than the thermal expansion amount $\lambda$, of the cycloidal gear.

Exemplification is as follows:

(Example 1) *Parameters of Research on . . . Meshing Rigidity of RV Transmission Cycloidal Gears Based on . . .*, Professor x, Dalian Jiaotong University, April 2017: RZ=77, e=1.50, Za=39, K1=0.7792, $\Delta rz$=−0.022, $\Delta RZ$=−0.027, and return difference=0.60'.

When return difference=0.60' and radial gap=0.05 (mm), backlash $\Delta c$=0.003 (mm) (excessively small).

(Example 2) RV-450E in *Design Research of Medium-low Power Housing Fixed RV-E Reducers*, Harbin Institute of Technology: RZ=155, e=3.0, Za=37, K1=0.7355, $\Delta rz$=−0.015, $\Delta RZ$=−0.03, return difference=0.33'.

When return difference=0.33' and radial gap=0.116 (mm), backlash $\Delta c$=0.007 (mm) (excessively small).

(Example 3) Parameters of RV-40E in *Research on Gear Gaps of High Precision RV Reducers based on . . .*, Professor x, Tongji University: RZ=64, e=1.30, Za=39; K1=0.8125, $\Delta rz$=−0.002, $\Delta RZ$=−0.008, return difference=0.36'.

When return difference=0.36' and radial gap=0.045 (mm), backlash $\Delta c$=0.003 (mm) (excessively small).

SUMMARY

The present application aims to propose a relational expression between a reasonable meshing backlash $\Delta c$ and a thermal expansion amount $\lambda$ in cycloidal gear modification and provide a hollow reducer for high precision control with good dynamic characteristics, so as to solve the defects of a high temperature rise during operation and a short service life in the art.

The technical solution of the present application is: a hollow reducer for high precision control, comprising a pin wheel housing and two-stage reduction components disposed in the pin wheel housing: a first-stage reduction component comprising a driving wheel on a servo motor, a dual gear, and a planet wheel, wherein the dual gear comprises a driven wheel and a sun wheel, the driven wheel is meshed with the driving wheel, the sun wheel is meshed with the planet wheel, the planet wheel is connected to a shaft extension end of an eccentric shaft of a second-stage reduction component, a line through pipe is disposed in an inner hole of the dual gear, and two sides of the dual gear are respectively supported on a right rigid disk and a corresponding position on a robot body by bearings; and the second-stage reduction component comprising 2-3 eccentric shafts distributed uniformly, cycloidal gears, a pin, a left rigid disk, and the right rigid disk, wherein the cycloidal gear is subjected to equidistant-radial moving composite modification, a radial gap and two backlashes $\Delta c$ are formed between the pin and a tooth socket of the cycloidal gear by the modification, the backlash is $\Delta c=(0.7-5)\lambda$ (mm), in the formula:

a thermal expansion amount of the cycloidal gear in the case when the reducer works at a rated torque is $\lambda=(d_0\Delta_t)$ $\alpha_t=0.00062d_0$ (mm), and a thermal expansion coefficient of bearing steel is $\alpha_t=1.379\cdot10^{-5}$ (1/° C.), $d_0$ is an average diameter of the cycloidal gear, and a temperature rise is $\Delta_t=45°$ C.

In a preferable embodiment of the present application, the backlash between the pin and the tooth socket of the cycloidal gear is $\Delta c=(0.8-3)\lambda$ (mm).

In a preferable embodiment of the present application, the backlash between the pin and the tooth socket of the cycloidal gear is $\Delta c=(0.9-2)\lambda$ (mm).

In a preferable embodiment of the present application, the backlash between the pin and the tooth socket of the cycloidal gear is $\Delta c=(1-1.4)\lambda$ (mm).

In a preferable embodiment of the present application, the backlash between the pin and the tooth socket of the cycloidal gear is $\Delta c \approx 1.1\lambda$ (mm).

In a preferable embodiment of the present application, the cycloidal gear is subjected to positive equidistant-positive radial moving composite modification.

In a preferable embodiment of the present application, the third bearing is a single-row radial thrust ball bearing with a seal or a thin-wall sealed four-point contact ball bearing or a thin-wall sealed crossed roller bearing, which can bear a radial load, a two-way thrust load, and a capsizing moment.

The present application has the following beneficial effects: in the hollow reducer for high precision control provided by the present application, the backlash $\Delta c$ generated by the equidistant-radial moving composite modification is closely correlated with the thermal expansion amount 2, of the cycloidal gear, thus achieving good dynamic characteristics, i.e., no overheating during operation at a rated load; a domestic machine tool of the present application has conventional manufacturing accuracy, a simple process, and a low cost; and external dimensions of the present application are the same as those of the RV reducer of Nabtesco, Japan, so the reducer of the present application can replace the RV reducer.

DESCRIPTION OF DRAWINGS

In order to clearly illustrate the technical solution in the embodiments of the present application, the drawing to be used in description of the embodiments will be briefly introduced below. It is apparent that the drawing described below only involves one embodiment of the present application. Those of ordinary skill in the art, without making creative effort, can obtain other accompanying drawings according to these accompanying drawings.

The sole FIGURE is a schematic diagram of a structural section of a preferable embodiment of a hollow reducer for high precision control in the present application.

Reference signs in the accompanying drawing: 1. pin wheel housing; 3. left cycloidal gear; 4. right cycloidal gear; 6. driven wheel; 7. sun wheel; 8. dual gear; 10. first bearing; 9. second bearing; 15. third bearing; 14. fourth bearing; 2. fifth bearing; 11. eccentric shaft; 12. planet wheel; 13. driving wheel; 5. right rigid disk; 16. left rigid disk; and 17. pin.

DETAILED DESCRIPTION

The technical solutions in the embodiments of the present application will be described clearly and completely below. It is apparent that, those embodiments described are only a part of the embodiments of the present application, rather than all of them. All the other embodiments obtained by those of ordinary skill in the art without making creative effort based on the embodiments in the present application shall fall into the protection scope of the present application.

As shown in the sole FIGURE, the embodiment of the present application includes the following:

A hollow reducer for high precision control includes a pin wheel housing 1 and two-stage reduction components disposed in the pin wheel housing. A first-stage reduction component includes a driving wheel 13 on a servo motor, a dual gear 8, and a planet wheel 12, wherein the dual gear 8 includes a driven wheel 6 and a sun wheel 7, the driven wheel 6 is meshed with the driving wheel 13, the sun wheel 7 is meshed with the planet wheel 12, the planet wheel 12 is connected to a shaft extension end of an eccentric shaft 11 of a second-stage reduction component, the dual gear 8 is formed with a line-passing pipe 8a which defines an inner hole of the dual gear 8, and two sides of the dual gear 8 are respectively supported on a right rigid disk 5 and a corresponding position on a robot body by a first bearing 10 and a second bearing 9. The second-stage reduction component includes 2-3 eccentric shafts 11 distributed uniformly, cycloidal gears, a pin 17, a left rigid disk 16, and the right rigid disk 5, wherein the cycloidal gears include a left cycloidal gear 3 and a right cycloidal gear 4, two eccentric sections of the eccentric shaft 11 are provided with a third bearing 15 used for supporting the cycloidal gear, shaft extensions on two sides of the eccentric section are respectively supported in peripheral holes of the left rigid disk 16 and the right rigid disk 5 by a fourth bearing 14, the left rigid disk 16 and the right rigid disk 5 are respectively supported in inner holes on two sides of the pin wheel housing 1 by a fifth bearing 2, flanges uniformly distributed on the left rigid disk 16 pass through corresponding holes on the cycloidal gear and are connected to the right rigid disk 5 by means of screws and positioning pins to form a rigid body, the cycloidal gear is subjected to equidistant-radial moving composite modification, and a radial gap and two backlashes $\Delta c$ are formed between the pin 17 and a tooth socket of the cycloidal gear by the modification. The backlash is $\Delta c=(0.7-5)\lambda$ (mm), wherein in the formula, a thermal expansion amount of the cycloidal gear in the case when the reducer works at a rated torque is $\lambda=(d0\Delta t)\alpha t=0.00062d0$ (mm).

A thermal expansion coefficient of bearing steel is $\alpha_t=1.379 \cdot 10^{-5}$ (1/° C.), wherein $d_0$ is an average diameter of the cycloidal gear, and a temperature rise is $\Delta_t=45°$ C.

The backlash $\Delta c$ is correlated with factors such as machining accuracy of a spacing between pins, machining accuracy of a pin diameter, a fitting spacing between the pin and a half-embedded hole, a pitch deviation of the cycloidal gear, and a deviation generated by assembly, and is also correlated with the model of the reducer. When the backlash $\Delta c$ is excessively small, a temperature rise is easy to occur; and when the backlash $\Delta c$ is excessively large and a rotation speed is relatively high, vibration is easy to occur.

*Thermal-structural Coupling Analysis of RV Reducers*, North China University of Technology (June 2016): "there is less domestic study on thermal-structural coupling of RV reducers, and thermal dissipation conditions of the grease lubrication used in the reducers are not good. During operation, various situations are closely correlated with thermal conditions. Hence, it is necessary to consider effects of the temperature on the component volume, so as to avoid an expansion jam due to the excessively high temperature. Cycloidal gears serve as a main heat source."

The backlash between the pin 17 and the tooth socket of the cycloidal gear is $\Delta c=(0.8-3)\lambda$ (mm).

The backlash between the pin 17 and the tooth socket of the cycloidal gear is $\Delta c=(0.9-2)\lambda$ (mm).

The backlash between the pin 17 and the tooth socket of the cycloidal gear is $\Delta c=(1-1.4)\lambda$ (mm).

The backlash between the pin 17 and the tooth socket of the cycloidal gear is $\Delta c \approx 1.1\lambda$ (mm). Reference is made to the following table:

| | RV-20E | RV-40E | RV-80E | RV-110E | RV-160E | RV-320E | RV-450E |
|---|---|---|---|---|---|---|---|
| Average diameter d0 of the cycloidal gear | 104 | 128 | 164 | 184 | 204 | 229 | 310 |
| (Thermal expansion + compensation amount) $\lambda$ | 0.077 | 0.096 | 0.122 | 0.138 | 0.152 | 0.176 | 0.232 |
| Backlash theoretical value $\Delta c$ | 0.083 | 0.101 | 0.133 | 0.152 | 0.159 | 0.186 | 0.248 |
| $\Delta c \approx 1.1\lambda$ | 1.08 | 1.05 | 1.09 | 1.1 | 1.05 | 1.06 | 1.07 |

It should be noted that when the backlash $\Delta c$ is excessively small, thermal expansion between the cycloidal gear and the pin 17 during loaded operation leads to noise increase, wear, vibration, and decrease of the service life.

The cycloidal gear is subjected to positive equidistant-positive radial moving composite modification. An acting force between the gear tooth and the pin in the positive equidistant-positive radial moving composite modification is 49% that in negative equidistant-negative radial moving composite modification; and a bearing force in the positive equidistant-positive radial moving composite modification is 1.71 times that in the negative equidistant-negative radial moving composite modification. A return difference of the positive equidistant-positive radial moving composite modification is reduced to satisfy a design requirement by means of an anti-backlash principle.

In equidistant modification, an increase in the wheel grinding radius indicates a positive equidistance; and on the contrary, a decrease in the wheel grinding radius indicates a negative equidistance.

In radial moving modification, a grinding wheel departing from the center of a working table indicates positive radial moving; and on the contrary, the grinding wheel moving towards the center of the working table indicates negative radial moving.

The third bearing 2 is a single-row radial thrust ball bearing with a seal or a thin-wall sealed four-point contact ball bearing that can bear a radial load, a two-way thrust load, and a capsizing moment, in which case a main machine structure can be simplified and the backlash can be adjusted very easily. The third bearing may also be a thin-wall sealed crossed roller bearing with a load capacity 5-15 times a rated load of a ball bearing due to line contact between a roller bearing and a roller path thereof, in which case the reliability is high and the service life is long. By application of a pre-load to the crossed roller bearing, the rigidity and rotation accuracy can be increased effectively.

The bearing with a seal is adopted to increase the service life of the bearing, as proved in the following:

(1) "Poor lubrication is a main cause leading to early-stage damage of bearings" (Liu Zejiu, *Application Manual of Rolling Bearings*, page 891).

(2) "Early-stage failures of bearings are usually not due to the fatigue damage caused by materials, but are due to pressing marks generated on the rolling contact surface and resulting from gradual deterioration of the lubricating grease after contaminants enter the bearings." (*Sealing Technology of Sealed Deep Groove Ball Bearings*, Bearings, May 2009).

(3) "In the case of a compact structure, it is better to use a radial ball bearing provided with seals on two faces. Lubricating grease sufficient for use in the whole service life is loaded into the radial ball bearing provided with seal rings on two faces." (Eiseman, *Design and Application Manual of Rolling Bearings*, page 221).

The hollow reducer for high precision control provided by the present application, compared with the prior art, has the following advantages:

(1) The backlash $\Delta c$ generated by the equidistant-radial moving composite modification in the present application is closely correlated with the thermal expansion amount $\lambda$ of the cycloidal gear, thus achieving good dynamic characteristics, i.e., no overheating during operation at a rated load.

(2) A domestic machine tool of the present application has conventional manufacturing accuracy, a simple process, and a low cost, so that suppression from the Japanese company by lowering down the price does not pose a threat.

(3) External dimensions of the present application are the same as those of the RV reducer of Nabtesco, Japan, so the reducer of the present application can replace the RV reducer.

The above descriptions are only the embodiments of the present application and do not intend to limit the patent scope of the present application. Equivalent structure or equivalent process conversions made based on the descriptions of the present application or those directly or indirectly applied in other related technical fields are similarly involved in the patent protection scope of the present application.

What is claimed is:

1. A hollow reducer for high precision control, comprising a pin wheel housing (1) and two-stage reduction components disposed in the pin wheel housing: a first-stage reduction component comprising a driving wheel (13) on a servo motor, a dual gear (8), and a planet wheel (12), wherein the dual gear (8) comprises a driven wheel (6) and a sun wheel (7), the driven wheel (6) is meshed with the driving wheel (13), the sun wheel (7) is meshed with the planet wheel (12), the planet wheel (12) is connected to a shaft extension end of an eccentric shaft (11) of a second-stage reduction component, the dual gear (8) is formed with a line-passing pipe (8a) which defines an inner hole of the dual gear (8), and two sides of the dual gear (8) are respectively supported on a right rigid disk (5) and a corresponding position on a robot body by a first bearing (10) and a second bearing (9); and the second-stage reduction component comprising 2-3 eccentric shafts (11) distributed uniformly, cycloidal gears, a pin (17), a left rigid disk (16), and the right rigid disk (5), wherein the cycloidal gears comprise a left cycloidal gear (3) and a right cycloidal gear (4), two eccentric sections of the eccentric shaft (11) are provided with a third bearing (15) used for supporting the cycloidal gears, shaft extensions on two sides of the eccentric section are respectively supported in peripheral holes of the left rigid disk (16) and the right rigid disk (5) by a fourth bearing (14), the left rigid disk (16) and the right rigid disk (5) are respectively supported in inner holes on two sides of the pin wheel housing (1) by a fifth bearing (2), flanges uniformly distributed on the left rigid disk (16) pass through corresponding holes on the cycloidal gears and are connected to the right rigid disk (5) by means of screws and positioning pins to form a rigid body, the cycloidal gears are subjected to equidistant-radial moving composite modification, and a radial gap and two backlashes $\Delta c$ are formed between the pin (17) and a tooth socket of each cycloidal gear by the modification, wherein:

the backlash between the pin (17) and the tooth socket of the each cycloidal gear is $\Delta c = (0.7\text{-}5)\lambda \text{(mm)}$, in the formula, $\lambda$ is a thermal expansion amount of the cycloidal gears in the case when the reducer works at a rated torque: $\lambda = (d_0 \Delta_t) \alpha_t = 0.00062 d_0$ (mm), a thermal expansion coefficient of bearing steel is $\alpha_t = 1.379 \cdot 10^{-5}$ (1/° C.), do is an average diameter of the cycloidal gears, and a temperature rise is $\Delta_t = 45°$ C.; and the cycloidal gears are subjected to positive equidistant-positive radial moving composite modification, and a return difference formed by the positive equidistant-positive radial moving composite modification is reduced to satisfy a design requirement by means of an anti-backlash principle.

2. The hollow reducer for high precision control according to claim 1, wherein the backlash between the pin (17) and the tooth socket of each cycloidal gear is $\Delta c = 0.7\lambda$ (mm).

3. The hollow reducer for high precision control according to claim 1, wherein the third bearing (2) is a single-row radial thrust ball bearing with a seal or a thin-wall sealed four-point contact ball bearing or a thin-wall sealed crossed roller bearing.

* * * * *